US012675337B2

(12) United States Patent
Chen et al.

(10) Patent No.: US 12,675,337 B2
(45) Date of Patent: Jul. 7, 2026

(54) MULTI-LAYERED DATA CENTER CAPACITY FORECASTING SYSTEM

(71) Applicant: Microsoft Technology Licensing, LLC, Redmond, WA (US)

(72) Inventors: Jieqiu Chen, Redmond, WA (US); Harsh Mahendra Mehta, Sammamish, WA (US); Boon Pin Yeap, Redmond, WA (US); Garet Marshall Anderson, Mount Vernon, WA (US); Dale Kenji Miyakusu, Campbell, CA (US); Vishnupriya Appiah Suresh Bapu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 430 days.

(21) Appl. No.: 18/263,282

(22) PCT Filed: Jan. 13, 2022

(86) PCT No.: PCT/US2022/012258
§ 371 (c)(1),
(2) Date: Jul. 27, 2023

(87) PCT Pub. No.: WO2022/173548
PCT Pub. Date: Aug. 18, 2022

(65) Prior Publication Data
US 2024/0095093 A1 Mar. 21, 2024

(30) Foreign Application Priority Data
Feb. 12, 2021 (LU) ........................................ 102509

(51) Int. Cl.
*G06F 12/00* (2006.01)
*G06F 9/50* (2006.01)

(52) U.S. Cl.
CPC .......... *G06F 9/5077* (2013.01); *G06F 9/5072* (2013.01); *G06F 2209/5019* (2013.01); *G06F 2209/5022* (2013.01); *G06F 2209/508* (2013.01)

(58) Field of Classification Search
CPC ................ G06F 9/5077; G06F 9/5072; G06F 2209/5019; G06F 2209/5022;
(Continued)

(56) References Cited

U.S. PATENT DOCUMENTS

| | | | | |
|---|---|---|---|---|
| 11,461,709 | B2 * | 10/2022 | Edgar ...................... | G06N 3/09 |
| 2020/0174839 | A1 * | 6/2020 | Venkadasamy ........ | G06N 20/00 |
| 2020/0285503 | A1 * | 9/2020 | Dou ...................... | G06F 9/5072 |

OTHER PUBLICATIONS

Hyndman, et al., "Another Look at Measures of Forecast Accuracy", Retrieved From: https://www.supplychainbusinesssolutions.com.au/data/uploads/images/doo/mase.pdf, Nov. 2, 2005, 18 Pages.
(Continued)

*Primary Examiner* — Shawn X Gu
(74) *Attorney, Agent, or Firm* — Schwegman Lundberg & Woessner, P.A.

(57) ABSTRACT
A system and method for configuring a cloud service center is described. The system accesses usage data of resources of the cloud service center. The usage data is standardized by applying a pre-processing operation to the usage data. The system generates a plurality of forecast models based on the standardized usage data. The forecast models predict a demand of the resources of the cloud service center. The system selects a demand forecast model from the forecast models based on a ranking of the forecast models. The system applies a postprocessing operation to the demand forecast that is generated based on the selected demand forecast model. The system configures the cloud service center based on the post-processed demand forecast.

15 Claims, 7 Drawing Sheets

508

COMPUTE TIME-TO-LIVE METRIC BASED ON FORECAST MODEL
502

GENERATE GRAPHICAL USER INTERFACE ILLUSTRATING THE TIME-TO-LIVE METRIC
504

CONFIGURE SERVER RESOURCES BASED ON THE TIME-TO-LIVE METRIC
506

(58) Field of Classification Search
CPC ............ G06F 2209/508; G06Q 10/063; G06Q
10/04; G06N 20/00
See application file for complete search history.

(56) References Cited

OTHER PUBLICATIONS

Hyndman, et al., "Forecasting: Principles and Practice", Published by OTexts, May 8, 2018, 504 Pages.
"Search Report and Written Opinion Issued in Luxembourg Patent Application No. LU102509", Mailed Date: Oct. 1, 2021, 9 Pages.
Makridakis, et al., "Statistical and Machine Learning Forecasting Methods: Concerns and Ways Forward", In Journal of PloS one, vol. 13, Issue 3, Mar. 27, 2018, 26 Pages.
"International Search Report and Written Opinion Issued in PCT Application No. PCT/US22/012258", Mailed Date: Apr. 12, 2022, 13 Pages.
Smyl, Slawek, "A Hybrid Method of Exponential Smoothing and Recurrent Neural Networks for Time Series Forecasting", In International Journal of Forecasting, vol. 36, Issue 1, Jan. 1, 2020, pp. 75-85.
Smyl, et al., "M4 Forecasting Competition: Introducing a New Hybrid ES-RNN Model", Retrieved From: https://www.uber.com/en-IN/blog/m4-foreoasting-competition/, Jun. 25, 2018, 15 Pages.
Wang, et al., "A New Tidy Data Structure to Support Exploration and Modeling of Temporal Data", In Repository of arXiv:1901.10257v1, Jan. 29, 2019, 28 Pages.

* cited by examiner

302 — ACCESS USAGE DATA

304 — STANDARDIZE USAGE DATA

306 — GENERATE FORECAST MODEL BASED ON STANDARDIZED USAGE DATA

308 — SELECT A FORECAST MODEL

310 — APPLY POST-PROCESSING TO THE DEMAND FORECAST

408

DETECT A CURRENT DEMAND
FORECAST DEVIATES FROM A
PREVIOUS DEMAND FORECAST

402

DETECT NOISE IN RECENT DATA
USAGE

404

SHIFT THE PREVIOUS DEMAND
FORECAST TO ALIGN WITH RECENT
USAGE DATA

406

MULTI-LAYERED DATA CENTER CAPACITY FORECASTING SYSTEM

CLAIM OF PRIORITY

This application is a U.S. national stage filing under 35 U.S.C. § 371 from International Application No. PCT/US2022/012258, filed on Jan. 13, 2022, and published as WO 2022/173548 on Aug. 18, 2022, which claims the benefit of priority to Luxembourg Patent Application No. LU102509, filed Feb. 12, 2021, which applications and publication are incorporated herein by reference in their entirety.

BACKGROUND

Management and control of computer networks is difficult to achieve efficiently and with flexibility. A similar problem arises in management and control of data centers. Often metrics are monitored and are available, but it is difficult to use those metrics to effectively manage and control the computer network, data center or other computing entity. Analyzing metrics related to an operation of a computer application can be difficult to achieve given the millions of data point entries and the lack of context of computed metrics. Furthermore, the effectiveness and accuracy of human-driven analysis of large sets of data is increasingly low compared to machine-driven analysis. For example, if an organization needs a time sensitive analysis of a data set that has millions of entries across hundreds of variables, no human could perform such an analysis by hand or mentally. Furthermore, any such analysis may be out-of-date almost immediately, should an update be required.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
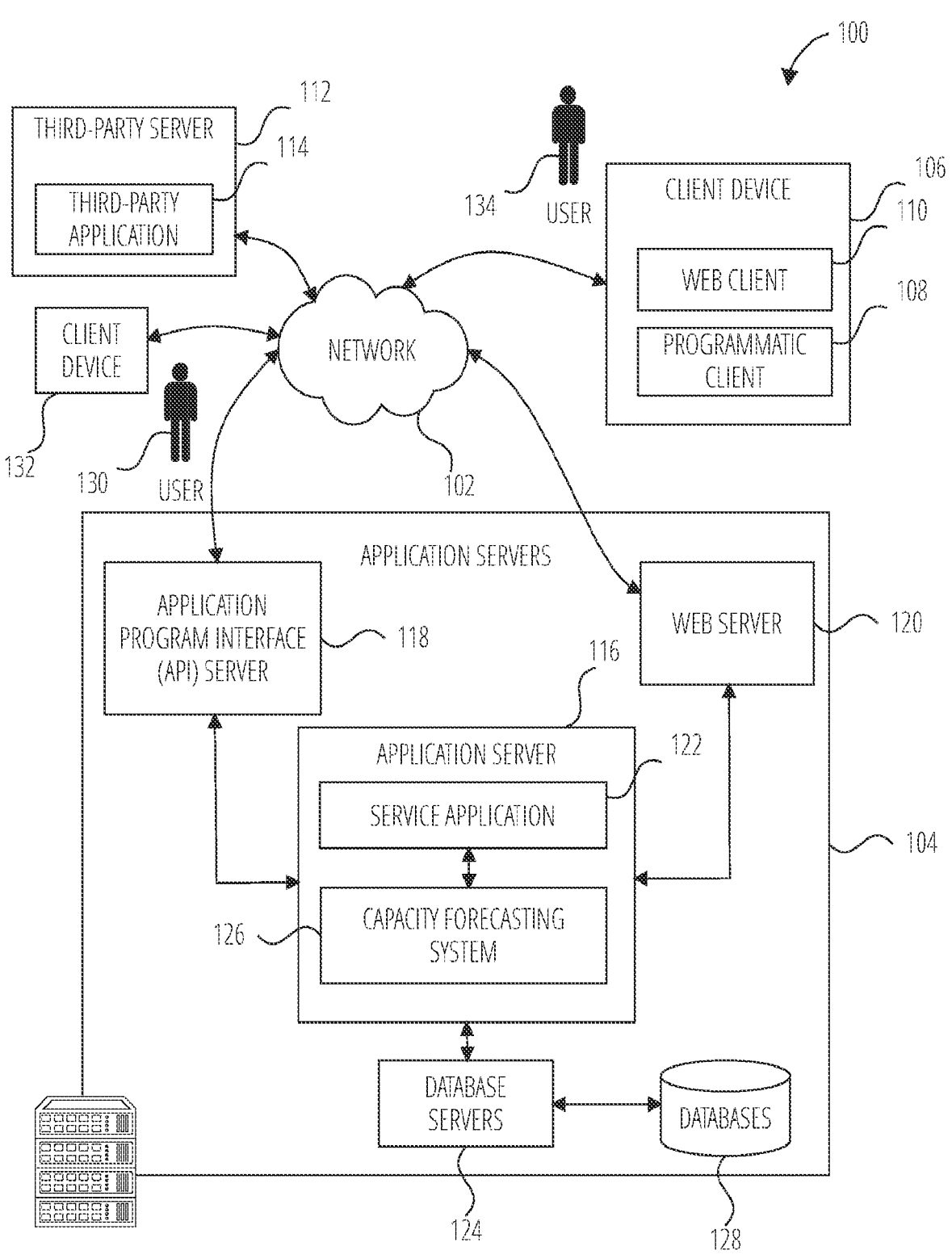
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a method for configuring a cloud service center based on a metric (e.g., time-to-live metric) and a cloud service resource demand forecast model. A demand forecasting system includes, for example, four major components: a pre-processing component, a forecast component, a model selection component, and a post-processing component.

The pre-processing component standardizes input time series (telemetry of usage of cloud services), performs missing data and outlier imputation, as well as other data transformation. After this step, the original noisy time series are ready to be modeled by different forecasting algorithms.

The forecast component includes a forecasting library that has different types of forecasting models (e.g., statistical, machine learning, and deep learning models). The forecast component may also include a new deep learning model (e.g., a hybrid model that combines exponential smoothing and LSTM techniques). The new deep learning model can learn across time series and has global and local parameters that capture both global and local features of the time series.

The model selection component also includes backtesting. The model selection component performs inference on the best model to choose for each time series based on historical model performance.

The post-processing component performs post-preprocessing functionality, such as perturbation adjustment and intelligent forecast override when the forecasts are unreasonable for the cloud services.

The present application describes a Time-To-Live (TTL) metric that measures the time until the cloud service center runs out of capacity. The TTL metric quantifies the availability of resources in terms of time. The system generates a graphical user interface (GUI) to help visualize the historical usage of the cloud services, future demand, and supply overtime in one consolidated graph. The GUI calculates TTL for different logical service unit and service roles, that provides capacity planners a tangible metric for prioritizing capacity issues and making sound planning decisions.

This multi-tiered forecasting system, including both the back-end forecasting software and the front-end user interface, provides the following technical advantages:

Scalable to new services: the cloud service center is dynamic. As such, a user may wish to forecast new workload and services. Using the present system, the user can plug in the usage telemetry of a new service and generate future demand forecast. This greatly reduces the headcount (data scientists, demand forecasters, etc.) to handle the forecast needs.

An advanced forecasting library and powerful model selection technique reduces human resources: the forecasting library includes all the known best performing time series forecasting methods; in addition, the present system implements advance model selection and ensemble algorithms that greatly enhanced the forecasting performance. In contrast, many conventional forecasts need manual model selection or tuning. The present forecasting system aim at reducing manual tuning to zero and thus saving additional resources.

Post-processing modules designed for capacity planning: conventional forecasting methods cannot accurately forecast usage time series, especially when the time series include noise or temporary negative trend. In such situations, conventional forecasting algorithms generate forecasts that overreact to noise or generate a downward trend forecast that is unusable for capacity planning purpose. The present system can automatically detect any unreasonable forecasts and override them with new forecasts.

The GUI facilitates fast capacity planning decision making: the GUI gathers all necessary information needed for capacity planners in one consolidated place and provide an easy to understand metric (e.g., TTL metric) for easy decision making. The TTL metric can be used for capacity related decisions. This metric and the consolidated information helps all parties involved in capacity decisions to easily discover capacity shortage issues and facilitate focused and sound decision making.

In one example embodiment, a system and method for configuring a cloud service center is described. The system accesses usage data of resources of the cloud service center. The usage data is standardized by applying a pre-processing operation to the usage data. The system generates a plurality of forecast models based on the standardized usage data. The forecast models predict a demand of the resources of the cloud service center. The system selects a demand forecast model from the forecast models based on a ranking of the forecast models. The system applies a post-processing operation to the demand forecast that is generated based on the selected demand forecast model. The system configures the cloud service center based on the post-processed demand forecast.

As a result, one or more of the methodologies described herein facilitate configuration of cloud service center based on forecast demand. In an example, the computing entity is a data center comprising one or more application servers as illustrated in FIG. 1. By efficient, accurate forecast of demand utilization and generating a time-to-live metric, it is possible to adjust, manage or control the data center in real time. In an example, where the data center comprises application servers which provide a cloud service to client devices, an end user has improved performance of the application and optimized user operations of the application. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 134 operates the client device 106. The client device 106 includes a web client 110 (e.g., a browser), a programmatic client 108 (e.g., an email/calendar application such as Microsoft Outlook™, an instant message application, a document writing application, a shared document storage application) that is hosted and executed on the client device 106.

An Application Program Interface (APT) server 118 and a web server 120 provide respective programmatic and web interfaces to application servers 104. A specific application server 116 hosts the service application 122 and a capacity forecasting system 126. The service application 122 and the capacity forecasting system 126 each include components, modules and/or applications.

The service application 122 includes a server side email/calendar enterprise application, a server side instant message enterprise application, a document authoring enterprise application, or a shared document storage enterprise application. The service application 122 enables users of an enterprise to collaborate and share document, messages, and other data (e.g., meeting information, common projects) with each other. For example, the user 134 at the client device 106 accesses and uses the service application 122 to edit documents that are shared with other users of the same enterprise. In another example, the client device 106 accesses and uses the service application 122 to retrieve or send messages or emails to and from other peer users of the enterprise. Other examples of service application 122 includes enterprise systems, content management systems, and knowledge management systems.

The capacity forecasting system 126 communicates with the service application 122 and accesses metrics indicative of the resource demand of the service application 122. For example, the resource demand includes user operation data of the service application 122. The user operation data includes, for example, data points that measure the frequency, dates, times of users operating the service application 122, and metrics indicative of accessed resources provided by the service application 122 or other cloud service center associated with the application server 116. In one example, a user 130 (e.g., a cloud service administrator) operates the client device 132 to access the metrics provided by the capacity forecasting system 126.

In one example embodiment, the capacity forecasting system 126 generates a forecast model based on the usage data of the service application 122 and provides a graphical user interface (GUI) to the client device 132. In a further embodiment, the GUI indicates a time-to-live metric and interactive user elements that enable the user 130 to configure resources provided by the application servers 104 by reallocating resources or seeking additional resources. In one example, the client device 132 communicates with the capacity forecasting system 126 and service application 122 via the programmatic interface provided by the Application Program Interface (API) server 118. In another example embodiment, the capacity forecasting system 126 can be located on a distinct server separate from the service application 122 and the application server 116. The capacity forecasting system 126 is described in more detail below with respect to FIG. 2.

The application server 116 is shown to be communicatively coupled to database servers 124 that facilitates access to an information storage repository or databases 128. In an example embodiment, the databases 128 includes storage devices that store information to be processed by the service application 122 and the capacity forecasting system 126.

Additionally, a third-party application 114 may, for example, store another part of the service application 122, or include a cloud storage system. For example, the third-party, application 114 stores additional metrics. The third-party application 114 executing on a third-party server 112, is shown as having programmatic access to the application server 116 via the programmatic interface provided by the Application Program Interface (API) server 118, For example, the third-party application 114, using information retrieved from the application server 116, may supports one or more features or functions on a website hosted by the third party.

Figure 2:
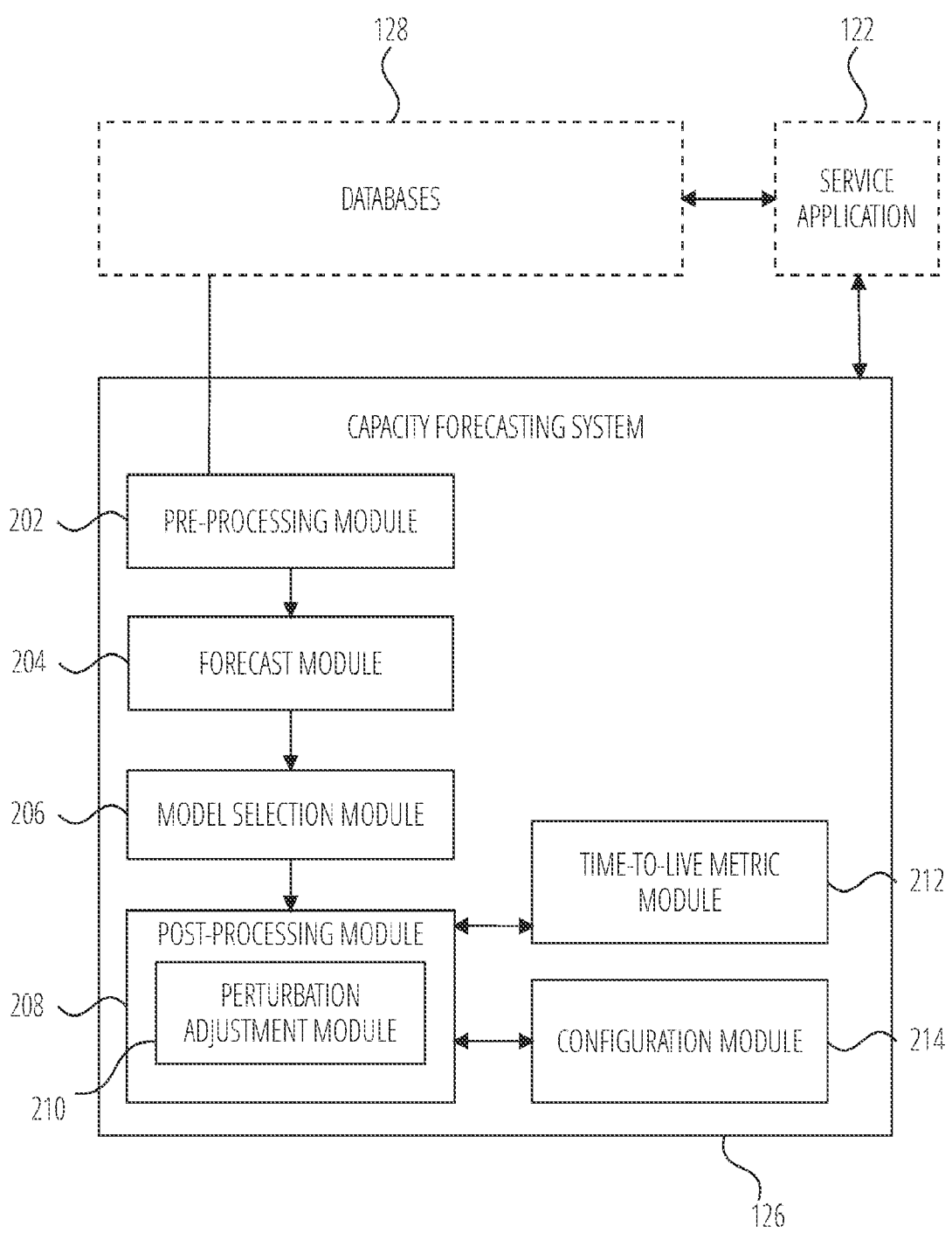
FIG. 2 is a block diagram illustrating a capacity forecasting system in accordance with one example embodiment.

FIG. 2 is a block diagram illustrating the capacity forecasting system 126 in accordance with one example embodiment. The capacity forecasting system 126 includes a preprocessing module 202, a forecast module 204, a model selection module 206, a post-processing module 208, a time-to-live metric module 212, and a configuration module 214.

The capacity forecasting system 126 accesses usage time series collected by the service application 122 or any data system that provide cloud services, performs transformations and computations, applies a variety of forecasting algorithms to generate future forecasts, and selects the best forecast based on criteria. The capacity forecasting system 126 also performs modification and adjustment of the forecasts to improve the usability of the forecast.

The capacity forecasting system 126 allows for standardization and modularization. The capacity forecasting system 126 standardizes time series and forecasts generated from the capacity forecasting system 126 (as well as any intermediate time series or forecasts). For example, by standardization of the input time series, the capacity forecasting system 126 can forecast time series from a new service easily by applying the same code base. The capacity forecasting system 126 modularizes different functionalities, so that each can be easily modified: for example, similar modules can be interchangeable, and new modules can be easily plug in to the capacity forecasting system 126 in the future. The capacity forecasting system 126 performs automatic model selection, and combined with post-processing, no manual model selection or adjustment on the forecast is needed.

The pre-processing module 202 performs pre-processing operations on the time series data. In one example embodiment, the pre-processing module 202 performs a time series standardization operation that converts the time series into a standard format in the format of <index, key, value>, where "index" represents date time concepts, "key" represents variables that uniquely identifies the time series, and "value" contains the actual value of the time series.

In another example embodiment, the pre-processing module 202 performs a missing data imputation operation that detects whether missing values exist in the time series. Additionally, the missing data imputation operation can impute the missing values using a specified method, such as "linear interpolation".

In another example embodiment, the pre-processing module 202 performs an outlier detection and imputation operation. This operation detects outliers in the time series as well as impute the outliers. Outliers can have a large influence on the forecasting methods, and imputing the outliers improves the forecast accuracy.

In another example embodiment, the pre-processing module 202 performs a seasonal decomposition operation. For time series with seasonality, the pre-processing module 202 decomposes the time series into three parts: trend, seasonality, and noise. Forecasting methods can be applied on the trend component, and the forecast for the original time series can be obtained by applying the seasonality to the trend. This functionality performs the decomposition step.

In another example embodiment, the pre-processing module 202 performs a mathematical transformation operation. An example of mathematical transformation includes log transformation (taking logarithm of the value) in the case where the variation of the time series increase/decrease over time. In one example, the pre-processing module 202 implement a Box Cox transformation, which includes log transformation as a special case, to make the distribution of the time series more normalized. If the value of the time series is known to be within certain boundaries (e.g., above zero and below certain maximum value (for reasons like maximum seats or market size)), the pre-processing module 202 can also force the forecast to be within a given range through mathematical transformations.

The pre-processing module 202 applies the standardization step to time series input depending on whether the time series have missing values/outliers/seasonality. One of ordinary skill in the art will appreciate that the pre-processing module 202 can apply a combination of the above-described functionalities/operations.

The forecast module 204 includes forecast function libraries. The forecast module 204 is used to generate forecasts from time series. In one example, the forecast module 204 includes time series forecasting methods (e.g., statistical-based method, and machine learning-based methods). In one example embodiment, the forecast module 204 implements statistical methods including linear and quadratic regression, ARIMA, Exponential Smoothing family (simple exponential smoothing, Holt's linear method, Holt-Winter's, HAN"s damped method), State Space model and Theta. The machine learning methods include, for example, Multi-Layer Perceptron, Bayesian Neural Network, Kernel Regression, Random Forests or Regression Trees, Gaussian Processes, and other deep learning methods for large collection of time series, and time series with complex patterns.

The model selection module 206 performs ensemble and model selection. For example, the model selection module 206 calculates performance metrics. The model selection module 206 calculates accuracy metrics for forecasting, such as error, mean absolute deviation (MAD), mean percentage error (MPE), mean absolute percentage error (MAPE), symmetric MAPE, and weighted MAPE. The model selection module 206 implements two types of weighted MAPE: one is weighted by the most recent value of the time series (larger time series are weighted higher and thus the error is more important), and the other one is weighted by time where more recent error is more has higher weight and thus is more important.

In another example, the model selection module 206 performs an ensemble operation where two or more model's prediction results are combined to generate a better prediction results than individual models. Ensemble of two or more forecast together generally produce better forecast. The model selection module 206 implements ensemble two forecasting models, where one can specify the weights of the model in the ensemble.

In another example, the model selection module 206 performs a backtesting operation. Backtesting is used to determine how forecasting models perform in the past, and the historical performance is the best estimate of how these models will perform in the future. The model selection module 206 performs a backtesting procedure that mimics how forecasts are generated. Performance is measured in history. Specifically, the model selection module 206 fixes the training data length and forecast horizon, generates a forecast and measures the forecasting accuracy in the past. From this, the model selection module 206 obtains one set of accuracy metrics. The model selection module 206 moves the training data origin by a few time steps and repeats the procedure to obtain another set of accuracy metrics. By doing this multiple times, the model selection module 206 generates a reliable estimate of the accuracy of the forecasting method.

The model selection module 206 includes a model selection operation that is based on the previously described functionalities of the model selection module 206. In step (a), for a given set of time series, the model selection module 206 first determines a set of base forecast models. For example, it is possible that the forecasting models exist in the forecasting library, or a hand-selected subset of the libraries that may work based on exploratory data analysis and/or domain knowledge. The model selection module 206 adjusts the performance metrics used to determine a ranking of the different methods. For example, the model selection module 206 uses weighted MADE, where the weight is determined based on recency in time.

In step (b), the model selection module 206 considers each forecasting model as base forecast. The model selection module 206 applies a backtesting procedure to generate historical forecasts and calculate the associated accuracy metrics for forecasting horizons. In step (c), the model selection module 206 ensembles any two base forecasts together and generates a new combined forecast. In one example embodiment, the model selection module 206 directly combines the based forecasts generated in step (b)'s backtesting and computes the forecast accuracy. If there are n base forecast models, then we can generate (n/2) ensembled forecasts, and so there is a total of n(n−1−1)/2 forecasts, including both the base and the ensembled forecasts.

In step (d), for each time series, the model selection module 206 ranks all the n(n+1) forecast methods based on their performance metrics, and chooses the one that is most accurate.

The model selection module 206 includes a forecast generation operation: for each time series, the model selection module 206 uses the best forecast model determined in step (d) of the model selection and applies it to the most recent training data.

The post-processing module 208 includes post-processing operations that modify the forecasts (that are generated based on the selected forecast model). The following illustrates examples of different types of post-processing functionalities:

Adjusting the forecast to original scale: whenever the pre-processing module 202 performs transformation of the time series in the pre-processing step, the post-processing module 208 transforms the forecast back into the original scale. For example, if the pre-processing module 202 performed the logarithm of the original time series, then the post-processing module 208 applies the exponential to the forecasted value to obtain the right forecast in the original scale.

Restore the decomposed forecasts: if the pre-processing module 202 performed a decomposition operation to a time series, the post-processing module 208 combines the forecasted value for the individual components in order to produce the desired forecast.

Forecast for new services or short history time series: for time series with short history (e.g., when the number of observations is not enough to perform backtesting), the model selection module 206 does not work in this case since the history is not long enough to produce any performance metrics. In post-processing operations, the post-processing module 208 applies a logic to forecast these short time series. For example, one logic for forecasting new forest time series is to calculate latest growth rates of the time series and extrapolating the latest growth rate into the future.

Overwrite forecasts that are unpractical: sometimes the organic forecasts generated are unpractical or unusable. Two example scenarios include: (i) for time series that should grow in the long run, the forecasts generated have a negative trend and sometime even go below zero; (ii) for time series where there is a sudden level shift or has recent exponential growth, sometimes the forecasts grow exponentially to the extent that they exceed the maximum logical value (for example, the whole capacity of a data center or region).

Overlay inorganic forecast on top of the organic forecast: when subject matter expert has information that is not observed in historical data, then the post-processing module 208 can adjust the forecast by overlaying an inorganic forecast on top of it. For example, if the post-processing module 208 knows in advance that a tenant will migrate to a new forecast, then the post-processing module 208 can adjust the forecast by taking into account the new tenant's storage size and migration speed. By overlaying the inorganic forecast, the post-processing module 208 has a more accurate picture of the capacity demand in the future.

In one example embodiment, the post-processing module 208 includes a perturbation adjustment module 210. The perturbation adjustment module 210 creates a new forecast by re-using the last good forecast. For example, the perturbation adjustment module 210 perturbs the last good forecast so that it is smoothly aligned with the latest actual. In one example, the perturbation adjustment includes a post-processing step that overwrites the organic forecast. An example operation of the perturbation adjustment module 210 is illustrated and described further below with respect to FIG. 6.

The time-to-live metric module 212 generates a metric that indicates available capacity and urgency around preventable actions. Traditionally, utilization is seen as the proxy to available capacity and way to track preventable actions. However, a utilization metric fails to represent the service risk where either the service has saturated and is running already at higher utilization. The time-to-live metric takes into account current and future changes in services and constraints in supply chain. The metric communicates the availability and the urgency of resource availability to enables software developers to add in optimizations.

The configuration module 214 configures the service application 122 and the application servers 104 based on the time-to-live metric. For example, if the metric falls below a predefined threshold, the configuration module 214 generates a graphical user interface that includes interactive element that allow the user to increase resource availability of the application servers 104 at a set time. One example of increasing resource availability is to reallocate resources from one cloud service center to another cloud service center.

Figure 3:
FIG. 3 is a flow diagram illustrating a method for generating a model for forecasting demand capacity in accordance with one example embodiment.
Figure 3:
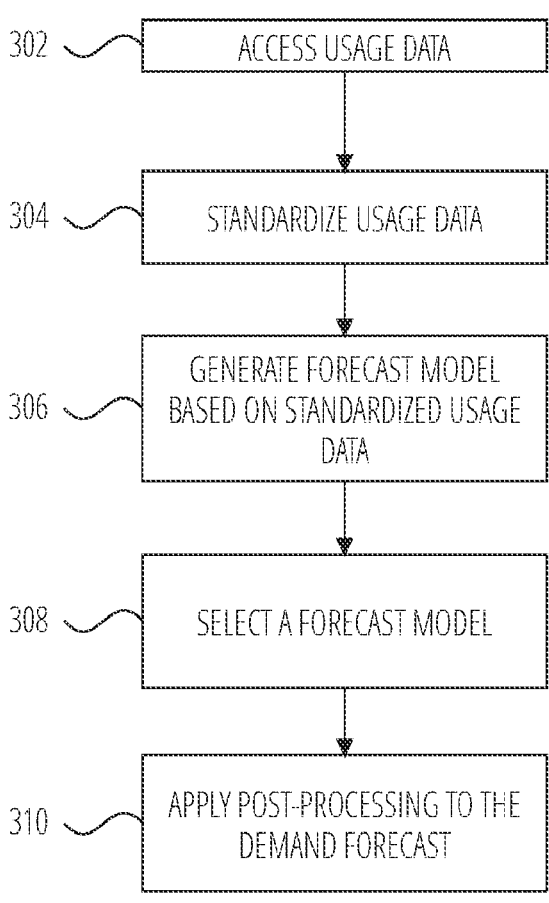

FIG. 3 is a flow diagram illustrating a method for generating a model in accordance with one example embodiment. Operations in the method 300 may be performed by the capacity forecasting system 126, using components (e.g., modules, engines) described above with respect to FIG. 2. Accordingly, the method 300 is described by way of example with reference to the capacity forecasting system 126. However, it shall be appreciated that at least some of the operations of the method 300 may be deployed on various other hardware configurations or be performed by similar components residing elsewhere. For example, some of the operations may be performed at the client device 106 or at the third-party server 112.

In block 302, the pre-processing module 202 accesses usage data and performs a pre-processing operation on the usage data. In block 304, the pre-processing module 202 standardizes the usage data. In block 306, the forecast module 204 generates forecast model based on the standardized usage data. In block 308, the model selection module 206 selects a forecast model. In block 310, the post-processing module 208 applies a post-processing operation to the demand forecast that is generated based on the selected demand forecast model.

Figure 4:
FIG. 4 is a flow diagram illustrating a method for generating a forecast model in accordance with one example embodiment.
Figure 4:
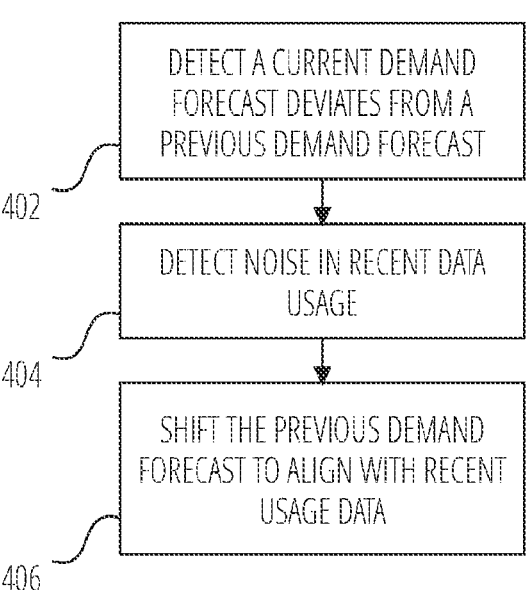

FIG. 4 is a flow diagram illustrating a method 408 for generating a forecast model in accordance with one example embodiment. Operations in the method 408 may be performed by the capacity forecasting system 126, using components (e.g., modules, engines) described above with respect to FIG. 2. Accordingly, the method 408 is described by way of example with reference to the capacity forecasting system 126. However, it shall be appreciated that at least some of the operations of the method 408 may be deployed on various other hardware configurations or be performed by similar components residing elsewhere. For example, some of the operations may be performed at the client device 106 or at the third-party server 112.

In block 402, the post-processing module 208 detects that a current demand forecast deviates from a previous demand forecast. In block 404, the post-processing module 208 detects noise in recent usage data. In response to detecting that the current demand forecast deviates from the previous demand forecast model, and detecting the noise, in block 406, the post-processing module 208 shifts the previous demand forecast to align with the recent usage data.

Figure 5:
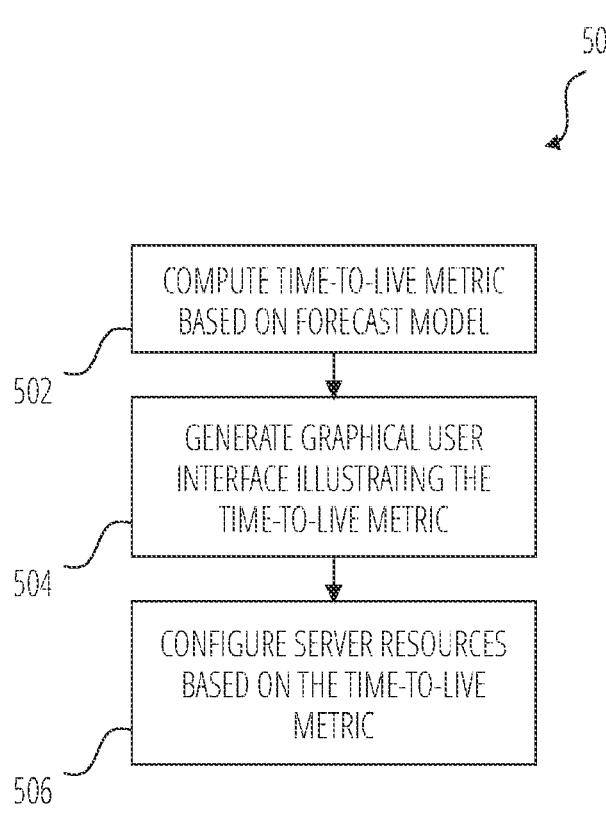
FIG. 5 is a flow diagram illustrating a method for configuring a server in accordance with one example embodiment.

FIG. 5 is a flow diagram illustrating a method 508 for configuring a server in accordance with one example embodiment. Operations in the method 508 may be performed by the capacity forecasting system 126, using components (e.g., modules, engines) described above with respect to FIG. 2. Accordingly, the method 508 is described by way of example with reference to the capacity forecasting system 126. However, it shall be appreciated that at least some of the operations of the method 408 may be deployed on various other hardware configurations or be performed by similar components residing elsewhere. For example, some of the operations may be performed at the client device 106 or at the third-party server 112.

In block 502, the time-to-live metric module 212 computes the time-to-live metric based on forecast model. In block 504, the configuration module 214 generates a graphical user interface illustrating the time-to-live metric. In block 506, the configuration module 214 configures server resources based on the time-to-live metric.

Figure 6:
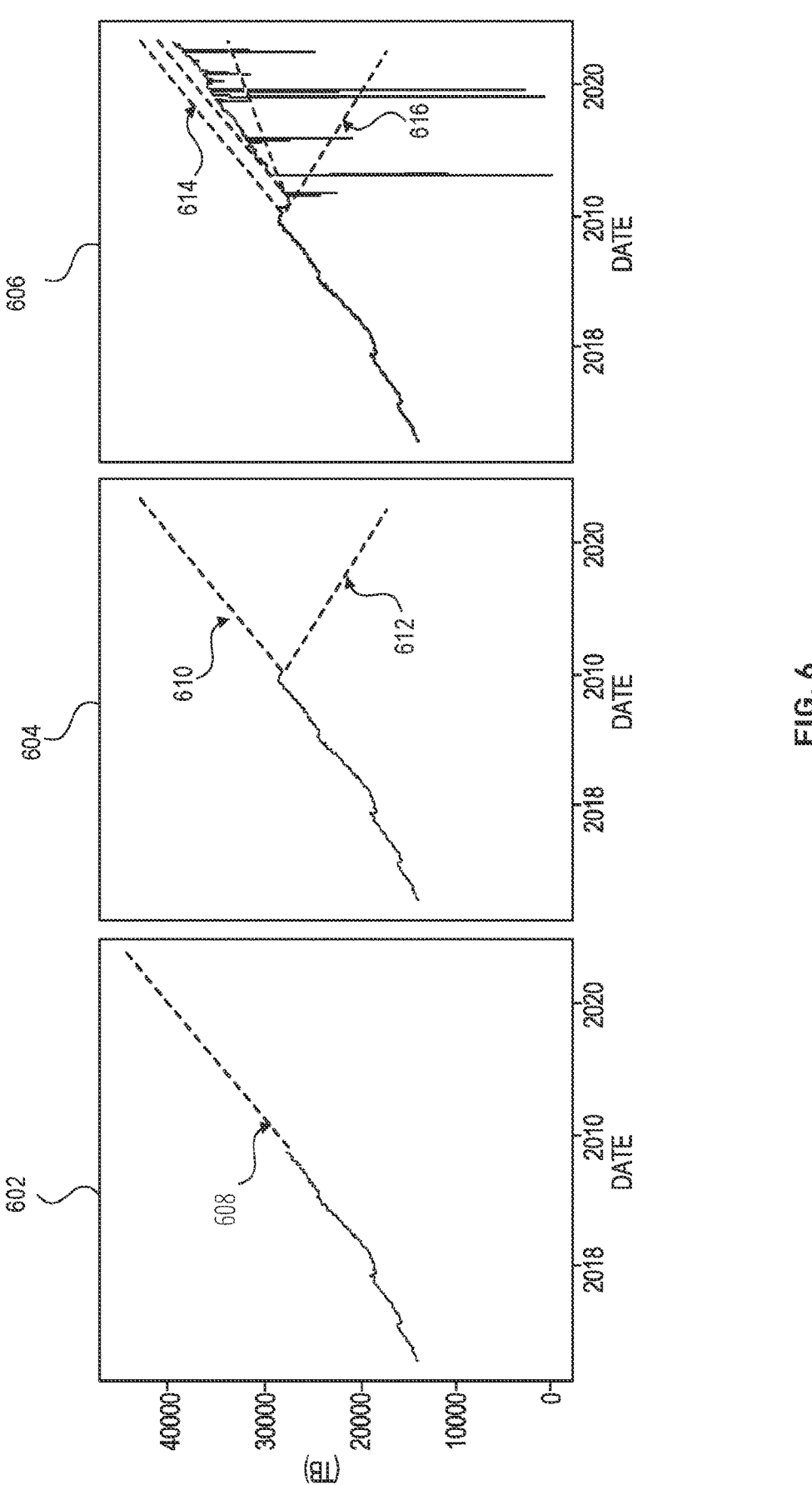
FIG. 6 illustrates a graph illustrating perturbation adjustments in accordance with one example embodiment.

FIG. 6 illustrates a graph illustrating perturbation adjustments in accordance with one example embodiment. Graph 602, graph 604, and graph 606 illustrate examples of time series where a small decrease of the storage resource occurred at the beginning of the January and then followed by a larger decrease at the beginning of February in 2019.

Graph 602 illustrates a forecast 608 based on the time series at the end of 2018. The forecast 608 correspond to the trending history at that time (end of 2018).

Graph 604 illustrates a forecast 612 that is based on a negative slope trend toward beginning of 2019 (the latest time series at that time has a negative trend). The forecast 612 is an inaccurate because the forecast 612 overreacts to the latest decrease in the trend. By using perturbation adjustment, the perturbation adjustment module 210 move the last forecast and align it with the actual at January 2019, which is depicted as last good forecast 610.

Graph 606 illustrates an adjusted forecast 616. The adjusted forecast 616 has a positive slope, but the trend of the adjusted forecast 616 does not align well with the historical trend as the growth is slower. By using perturbation adjustment, the perturbation adjustment module 210 generates a last good forecast 614 that mimics the growth in the past. Graph 606 also illustrates the actual of the time series in black solid line, and it can be seen that indeed the forecast created by perturbing a good old forecast (last good forecast 614) is better than the new forecast (adjusted forecast 616), which was not as accurate as the level change happened at the beginning of 2019.

FIG. 6 illustrates an example case of perturbation adjustment, that is, to create a new forecast by using the last good forecast that better captures the trend in the time series, especially if the recent data has some issues (has sudden change from history, outliers, or simply missing). Another use case of this technique is to create a new forecast when there is not enough time or resource to generate a whole new set of forecasts.

Figure 7:
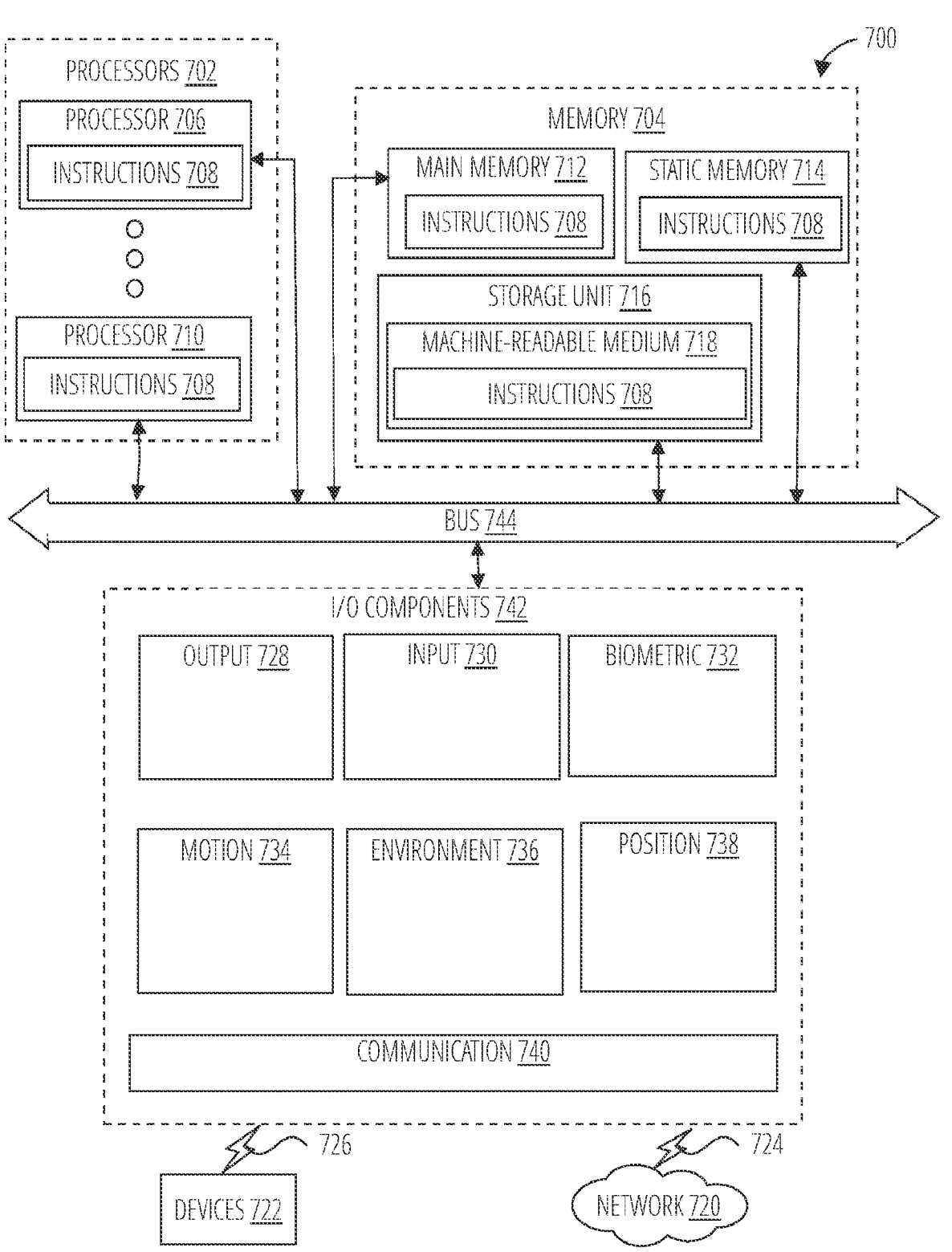
FIG. 7 is a diagrammatic representation of a machine in the form of a computer system within which a set of instructions may be executed for causing the machine to perform any one or more of the methodologies discussed herein, according to an example embodiment.

FIG. 7 is a diagrammatic representation of the machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 701) may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (MSC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 706 and a Processor 710 that execute the instructions 708. The term "Processor" is intended to include multi-core processors that may comprise two or more independent processors (sometimes referred to as "cores") that may execute instructions contemporaneously. Although FIG. 7 shows multiple processors 702, the machine 700 may include a single Processor with a single core, a single Processor with multiple cores (e.g., a multi-core Processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the Processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730, The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface Component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RHD) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code, Data Matrix, Dataglyph, MaxiCode, PDF417, Ultra. Code, UCC RSS-2D bar code, and other optical codes), or acoustic detection components (e.g., microphones to identify tagged audio signals), In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface Component included in the communication components 710) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed. Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method for configuring a cloud service center comprising:
   accessing usage data of resources of the cloud service center;
   standardizing the usage data by applying a pre-processing operation to the usage data;
   generating a plurality of forecast models based on the standardized usage data, the plurality of forecast models being configured to predict a demand of the resources of the cloud service center;
   selecting a demand forecast model from the plurality of forecast models based on a ranking of the plurality of forecast models;
   applying a post-processing operation to a demand forecast that is generated based on the selected demand forecast model, by, when the demand forecast is unusable, creating a new forecast by perturbing a last good forecast so that it is smoothly aligned with a latest actual of a time series of the usage data; and
   configuring the cloud service center based on the post-processed demand forecast.

2. The computer-implemented method of claim 1, further comprising:
   detecting that a current demand forecast deviates from a previous demand forecast;
   detecting noise in recent usage data; and
   in response to detecting that the current demand forecast deviates from the previous demand forecast model, and detecting the noise, shifting the previous demand forecast to align with the recent usage data.

3. The computer-implemented method of claim 2, further comprising:
   determining a time-to-live metric based on the shifted previous forecast model and a capacity of the cloud service center, the time-to-live metric indicating a predicted time at which demands for the resources of the cloud service center exceed the resources of the cloud service center; and
   detecting that the time-to-live metric transgresses a capacity threshold of the cloud service center,
   wherein configuring the cloud service center is in response to the time-to-live metric transgressing the capacity threshold.

4. The computer-implemented method of claim 1, further comprising:
   generating a graph in a graphical user interface that illustrates the demand forecast model and a time-to-live metric; and
   generating a user-interactive graphical user interface element that enables an administrator of the cloud service center to allocate additional resources to the cloud service center relative to the time-to-live metric.

5. The computer-implemented method of claim 4, wherein the graphical user interface indicates a date based on the time-to-live metric.

6. The computer-implemented method of claim 1, wherein the pre-processing operation comprises at least one of a time-series standardization operation, a missing data imputation operation, an outlier detection and imputation operation, a seasonal decomposition operation, or a mathematical transformation operation.

7. The computer-implemented method of claim 1, wherein generating the plurality of forecast models is based on time series of the usage data, wherein the plurality of forecast models are based on one of a statistical method, and a machine learning method.

8. The computer-implemented method of claim 1, wherein selecting the demand forecast model is based on at least one of a performance metrics calculation, an ensemble machine learning technique, a backtesting, a model selection, or a forecast generation.

9. The computer-implemented method of claim 1, further comprising:
   determining a set of base forecast models;
   applying a backtesting procedure for each forecast model;
   ensembling two base forecast models to generate a new combined forecast; and
   ranking the base forecast models and the new combined forecast.

10. The computer-implemented method of claim 1, wherein the post-processing operation comprises at least one of: transforming the demand forecast to an original scale, restoring a decomposed forecast, forecasting for new services, overwriting forecasts that are unusable, overlaying an inorganic forecast on top of an organic forecast.

11. A computing apparatus comprising:
   a processor; and
   a memory storing instructions that, when executed by the processor, configure the apparatus to:
   access usage data of resources of a cloud service center;
   standardize the usage data by applying a pre-processing operation to the usage data;
   generate a plurality of forecast models based on the standardized usage data, the plurality of forecast models being configured to predict a demand of the resources of the cloud service center;

select a demand forecast model from the plurality of forecast models based on a ranking of the plurality of forecast models;

apply a post-processing operation to a demand forecast that is generated based on the selected demand forecast model, by, when the demand forecast is unusable, creating a new forecast by perturbing a last good forecast so that it is smoothly aligned with a latest actual of a time series of the usage data; and configure the cloud service center based on the post-processed demand forecast.

12. The computing apparatus of claim 11, wherein the instructions further configure the apparatus to:

detect that a current demand forecast deviates from a previous demand forecast;

detect noise in recent usage data; and in response to detect that the current demand forecast deviates from the previous demand forecast, and detecting the noise, shifting the previous demand forecast to align with the recent usage data.

13. The computing apparatus of claim 12, wherein the instructions further configure the apparatus to:

determine a time-to-live metric based on the shifted previous demand forecast and a capacity of the cloud service center, the time-to-live metric indicating a predicted time at which demands for the resources of the cloud service center exceed the resources of the cloud service center; and detect that the time-to-live metric transgresses a capacity threshold of the cloud service center, wherein configuring the cloud service center is in response to the time-to-live metric transgress the capacity threshold.

14. The computing apparatus of claim 11, wherein the instructions further configure the apparatus to:

generate a graph in a graphical user interface that illustrates the demand forecast model and a time-to-live metric; and generate a user-interactive graphical user interface element that enables an administrator of the cloud service center to allocate additional resources to the cloud service center relative to the time-to-live metric.

15. A non-transitory computer-readable storage medium, the computer-readable storage medium including instructions that when executed by a computer, cause the computer to:

access usage data of resources of a cloud service center;

standardize the usage data by applying a pre-processing operation to the usage data;

generate a plurality of forecast models based on the standardized usage data, the plurality of forecast models being configured to predict a demand of the resources of the cloud service center;

select a demand forecast model from the plurality of forecast models based on a ranking of the plurality of forecast models;

apply a post-processing operation to a demand forecast that is generated based on the selected demand forecast model, by, when the demand forecast is unusable, creating a new forecast by perturbing a last good forecast so that it is smoothly aligned with a latest actual of a time series of the usage data; and configure the cloud service center based on the post-processed demand forecast.

* * * * *